(12) United States Patent
Gadkaree et al.

(10) Patent No.: US 8,784,764 B2
(45) Date of Patent: *Jul. 22, 2014

(54) METHODS FOR FORMING ACTIVATED CARBON MATERIAL FOR HIGH ENERGY DENSITY ULTRACAPACITORS

(75) Inventors: Kishor Purushottam Gadkaree, Big Flats, NY (US); Joseph Frank Mach, Lindley, NY (US)

(73) Assignee: Corning Incorporated, Corning, NY (US)

( * ) Notice: Subject to any disclaimer, the term of this patent is extended or adjusted under 35 U.S.C. 154(b) by 761 days.

This patent is subject to a terminal disclaimer.

(21) Appl. No.: 12/335,078

(22) Filed: Dec. 15, 2008

(65) Prior Publication Data

US 2010/0150814 A1    Jun. 17, 2010

(51) Int. Cl.
| | |
|---|---|
| *B01J 21/18* | (2006.01) |
| *C01B 31/08* | (2006.01) |
| *H01M 4/88* | (2006.01) |
| *C01B 31/00* | (2006.01) |
| *H01M 4/13* | (2010.01) |
| *H01M 4/133* | (2010.01) |
| *C01B 31/12* | (2006.01) |
| *H01M 4/583* | (2010.01) |
| *H01M 4/00* | (2006.01) |
| *H01M 4/86* | (2006.01) |
| *H01M 4/02* | (2006.01) |

(52) U.S. Cl.
CPC ............... *H01M 4/133* (2013.01); *H01M 4/00* (2013.01); *H01M 4/88* (2013.01); *H01M 4/86* (2013.01); *H01M 4/02* (2013.01); *C01B 31/08* (2013.01); *C01B 31/125* (2013.01); *H01M 4/583* (2013.01); *Y02E 60/122* (2013.01)

USPC ....... 423/445 R; 502/180; 502/416; 502/432; 502/101; 429/231.8

(58) Field of Classification Search
None
See application file for complete search history.

(56) References Cited

U.S. PATENT DOCUMENTS

| | | | | |
|---|---|---|---|---|
| 5,356,852 | A | * 10/1994 | DeLiso et al. ................ | 502/402 |
| 5,883,040 | A | 3/1999 | Armstrong et al. ........... | 502/437 |
| 5,956,225 | A | * 9/1999 | Okuyama et al. ............. | 361/502 |
| 6,043,183 | A | 3/2000 | Alford .......................... | 502/180 |
| 6,060,424 | A | 5/2000 | Alford .......................... | 502/416 |

(Continued)

FOREIGN PATENT DOCUMENTS

| | | |
|---|---|---|
| JP | 1999-349318 | 12/1999 |
| JP | 2008-098354 | 4/2008 |
| JP | 2008-207982 | 9/2008 |

OTHER PUBLICATIONS

Bansode et al.; Pecan Shell-Based Granular Activated Carbon for Treatment of Chemical Oxygen Demand in Municipal Wastewater; Bioresource Technology; 94, 129-135; 2004.*

(Continued)

*Primary Examiner* — Guinever Gregorio
(74) *Attorney, Agent, or Firm* — Michael W. Russell

(57) ABSTRACT

A method for producing an activated carbon material includes forming an aqueous mixture of a natural, non-lignocellulosic carbon precursor and an inorganic compound, heating the mixture in an inert or reducing atmosphere, cooling the heated mixture to form a first carbon material, and removing the inorganic compound to produce an activated carbon material. The activated carbon material is suitable to form improved carbon-based electrodes for use in high energy density devices.

21 Claims, 2 Drawing Sheets

(56) References Cited

U.S. PATENT DOCUMENTS

| | | |
|---|---|---|
| 6,201,685 B1 | 3/2001 | Jerabek et al. ............... 361/502 |
| 6,212,062 B1 | 4/2001 | Day et al. ..................... 361/502 |
| 6,225,733 B1 * | 5/2001 | Gadkaree et al. ............ 313/352 |
| 6,304,426 B1 | 10/2001 | Wei et al. ..................... 361/502 |
| 6,335,857 B1 * | 1/2002 | Takimoto et al. ............ 361/502 |
| 6,487,066 B1 | 11/2002 | Niiori et al. .................. 361/502 |
| 6,565,701 B1 | 5/2003 | Jerabek et al. ............... 156/305 |
| 6,682,667 B1 * | 1/2004 | Matviya ....................... 264/29.4 |
| 6,714,391 B2 | 3/2004 | Wilk et al. ..................... 361/15 |
| 6,738,252 B2 | 5/2004 | Okamura et al. ............ 361/502 |
| 8,482,900 B2 * | 7/2013 | Gadkaree et al. ............ 361/502 |
| 2002/0048144 A1 | 4/2002 | Sugo et al. ................... 361/502 |
| 2004/0085710 A1 | 5/2004 | Takeuchi et al. ............ 361/502 |
| 2005/0014643 A1 | 1/2005 | Lini et al. ..................... 502/432 |
| 2005/0047061 A1 | 3/2005 | Sugo et al. ................... 361/502 |
| 2005/0207962 A1 | 9/2005 | Dietz et al. ................... 423/445 |
| 2006/0093915 A1 | 5/2006 | Lundquist et al. ......... 129/231.8 |
| 2006/0229476 A1 * | 10/2006 | Mitchell et al. ............. 568/959 |
| 2007/0010666 A1 | 1/2007 | Tajiri et al. ................... 536/127 |
| 2007/0265161 A1 * | 11/2007 | Gadkaree et al. ............ 502/417 |
| 2008/0003166 A1 | 1/2008 | Maletin et al. ............... 423/445 |
| 2008/0207442 A1 * | 8/2008 | Pfeifer et al. ................ 502/416 |
| 2008/0207443 A1 * | 8/2008 | Gadkaree et al. ............ 502/417 |
| 2010/0321863 A1 | 12/2010 | Kurakane et al. ............ 361/502 |

OTHER PUBLICATIONS

Schroder, et al "Experiments on the generation of activated carbon from biomass" J. of Analytical and Applied Pyrolsis 79 (2007) 106-111.

Hameed, et al "Removal of pheonol from aqueous solutions by adsorption onto activated carbon prepared from biomass material" J. of Hazardous Materials 160 (2008) 576-581.

Taberna, et al "Activated carbon-carbon nanotube composite porous film for supercapacitor applications" Materials Research Bulletin 41 (2006) 478-484.

Tanso 231—Abstracts—Carbon 46 (2008) 721-722.

JP, Application No. 2011-542318, Office Action dated Dec. 17, 2013, pp. 1-5.

Taiwan Office Action dated Oct. 7, 2013.

Taiwan Search Report dated Feb. 22, 2013.

* cited by examiner

METHODS FOR FORMING ACTIVATED CARBON MATERIAL FOR HIGH ENERGY DENSITY ULTRACAPACITORS

BACKGROUND AND SUMMARY

The present invention relates to carbon-based electrodes and, more specifically, to porous activated carbon material and methods for preparing an activated carbon material for use in making such electrodes. The invention also relates to high power density energy storage devices comprising carbon-based electrodes.

Energy storage devices such as ultracapacitors may be used in many applications where a discrete power pulse is required. Such applications range from cell phones to hybrid vehicles. An important characteristic of an ultracapacitor is the energy density that it can provide. The energy density of the device, which can comprise two or more carbon-based electrodes separated by a porous separator and/or an organic electrolyte, is largely determined by the properties of the carbon-based electrodes.

Carbon-based electrodes suitable for incorporation into high energy density devices are known. For example, high performance carbon materials, which form the basis of such electrodes, can be made from synthetic phenolic resin precursors. However, due to the high cost of the synthetic resins, the cost of such carbon-based electrodes can be high. Accordingly, it would be an advantage to provide a more economical carbon material that can be used to form carbon-based electrodes that enable higher energy density devices.

According to one aspect of the invention, activated carbon material that is suitable for incorporation into carbon-based electrodes for use in ultracapacitors and other high power density energy storage devices is derived from natural non-lignocellulosic materials. By using non-lignocellulosic materials as a precursor for the porous, activated carbon material, economically viable, high power, high energy density devices can be formed. As defined herein, unless expressly defined otherwise, "natural, non-lignocellulosic carbon precursor" means at least one natural, non-lignocellulosic carbon precursor. Likewise, reference to an "inorganic compound" means at least one inorganic compound.

According to a further aspect of the invention, an activated carbon material is prepared by forming an aqueous mixture of a natural, non-lignocellulosic carbon precursor and an inorganic compound, heating the aqueous mixture in an inert or reducing atmosphere to carbonize the carbon precursor, and removing the inorganic compound to produce the activated carbon material.

According to a yet further aspect of the invention, an activated carbon material is prepared by heating a natural, non-lignocellulosic carbon precursor in an inert or reducing atmosphere to form a first carbon material, mixing the first carbon material with an inorganic compound to form an aqueous mixture, heating the aqueous mixture in an inert or reducing atmosphere to incorporate the inorganic compound into the first carbon material, and removing the inorganic compound from the first carbon material to produce a porous, activated carbon material.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

Figure 1A:
FIGS. 1A and 1B are SEM micrographs showing comparative carbon material derived from a lignocellulosic carbon precursor.

A method for producing an activated carbon material comprises forming an aqueous mixture of a natural, non-lignocellulosic carbon precursor and an inorganic compound, heating the aqueous mixture in an inert or reducing atmosphere to carbonize the carbon precursor, and removing the inorganic compound from the carbonized carbon precursor.

A further method for producing an activated carbon material comprises heating a natural, non-lignocellulosic carbon precursor in an inert or reducing atmosphere to form a first carbon material, mixing the first carbon material with an inorganic compound to form a mixture, heating the mixture to incorporate the inorganic compound into the first carbon material, and removing the inorganic compound from the first carbon material. Advantageously, the step of mixing can comprise mixing the first carbon material with an aqueous mixture of the inorganic compound.

The porous, activated carbon materials formed according to any of the foregoing methods are suitable to form carbon-based electrodes for use in high energy density devices.

During the mixing, the inorganic compound can be incorporated into the structure of the natural, non-lignocellulosic carbon precursor or of the first carbon material. In one approach, the inorganic compound is initially dissolved in a solvent such as water. The mixture comprising the inorganic compound is then mixed with the natural, non-lignocellulosic carbon precursor or the first carbon material, and the mixture is allowed to age for an amount of time effective to permit incorporation of the inorganic compound into the natural, non-lignocellulosic carbon precursor or the first carbon material. The mixture can be aged for 0.5, 1, 2, 4, 8 or more hours (e.g., from 0.5 to 8 hours).

The non-lignocellulosic carbon precursor and the inorganic compound can be combined in any suitable ratio. A ratio, expressed in weight percent, of natural, non-lignocellulosic carbon precursor to inorganic compound can range from about 10:1 to 1:10. Non-limiting, exemplary ratios include 9:1, 8:1, 7:1, 6:1, 5:1 4:1, 3:1, 2:1, 1:1, 1:2, 1:3, 1:4, 1:5, 1:6, 1:7, 1:8 and 1:9. According to one embodiment, the ratio of inorganic compound to natural, non-lignocellulosic carbon precursor is greater than or equal to 1 (e.g., 10:1, 9:1, 8:1, 7:1, 6:1, 5:1, 4:1, 3:1, 2:1 or 1:1).

Similarly, the first carbon material and inorganic compound can be combined in any suitable ratio. A ratio, expressed in weight percent, of natural, non-lignocellulosic carbon precursor to inorganic compound can range from about 10:1 to 1:10 (e.g., 9:1, 8:1, 7:1, 6:1, 5:1 4:1, 3:1, 2:1, 1:1, 1:2, 1:3, 1:4, 1:5, 1:6, 1:7, 1:8 or 1:9).

In embodiments where the inorganic compound is incorporated into the natural, non-lignocellulosic carbon precursor, the (optionally aged) mixture is heated at a temperature effective to carbonize the carbon precursor. The mixture can be heated in an inert or reducing atmosphere. The mixture can be heated at a temperature from about 600° C. to 900° C. (e.g., 600, 650, 700, 750, 800, 850 or 900° C.) for a predetermined time (e.g., 0.5, 1, 2, 4, 8 or more hours) and then cooled. During the heating step, the natural, non-lignocellulosic carbon precursor decomposes and forms carbon.

In embodiments where the inorganic compound is incorporated into the first carbon material, the mixture is heated at a temperature effective to incorporate the inorganic compound into the first carbon material. The mixture can be heated at a temperature from about 300° C. to 850° C. for a predetermined time (e.g., 0.5, 1, 2, 4, 8, or more hours) and then cooled.

After cooling, the carbon material with the inorganic compound incorporated therein is rinsed in a solvent to remove the inorganic compound. A preferred solvent for extracting the inorganic compound is water. Optionally, the extraction solvent can include an acid. One process for removing the inorganic compound involves sequentially rinsing the carbon material with water and acid. A further process for removing the inorganic compound involves rinsing the carbon material with an aqueous acid mixture (e.g., mixture of acid and water). Acids used during the extraction can include hydrochloric acid. The process of extracting the inorganic compound forms a porous, activated carbon material, the pores being defined by the volume previously filled by the inorganic compound. The invention also relates to the porous activated carbon material made according to any one of the foregoing methods.

The carbon material made using the inventive method can have a specific surface area greater than about 300 $m^2/g$, i.e., greater than 350, 400, 500 or 1000 $m^2/g$.

A method for producing a carbon-based electrode comprises forming an aqueous mixture of a natural, non-lignocellulosic carbon precursor and an inorganic compound, heating the aqueous mixture in an inert or reducing atmosphere to carbonize the carbon precursor, removing the inorganic compound from the carbonized precursor, and forming a carbon-based electrode from the resulting porous, activated carbon material.

A further method for producing a carbon-based electrode comprises heating an natural, non-lignocellulosic carbon precursor in an inert or reducing atmosphere to form a first carbon material, mixing the first carbon material with an inorganic compound to form a mixture, heating the mixture to incorporate the inorganic compound into the first carbon material, removing the inorganic compound from the first carbon material to produce a porous, activated carbon material, and forming a carbon-based electrode from the porous, activated carbon material.

A still further method for producing a carbon-based electrode comprises heating an natural, non-lignocellulosic carbon precursor in an inert or reducing atmosphere to form an intermediate carbon material, heating the intermediate carbon material in an oxidizing atmosphere, and forming a carbon-based electrode from the resulting porous, activated carbon material. The oxidizing atmosphere can comprise steam ($H_2O$), CO and/or $CO_2$.

Optionally, in conjunction with the foregoing methods for producing a carbon-based electrode, the porous activated carbon material can be mixed with carbon black and/or a polymeric binder such as polytetrafluoroethylene (PTFE) or other suitable binder and compacted to form the carbon-based electrode.

By way of example, a carbon paper having a thickness in the range of about 100-300 microns can be prepared by rolling and pressing a powder mixture comprising 60-90 wt. % activated carbon material, 5-20 wt. % carbon black and 5-20 wt. % PTFE. Carbon sheets can be stamped or otherwise patterned from the carbon paper and laminated to a conductive current collector to form a carbon-based electrode.

The high energy density device can include an ultracapacitor. Ultracapacitors can have a jelly roll design, prismatic design, honeycomb design, or other suitable configuration. A carbon-based electrode made according to the present invention can be incorporated into a carbon-carbon ultracapacitor or into a hybrid ultracapacitor. In a carbon-carbon ultracapacitor, both of the electrodes are carbon-based electrodes. In a hybrid ultracapacitor, on the other hand, one of the electrodes is carbon-based, and the other electrode can be a pseudo capacitive material such as lead oxide, ruthenium oxide, nickel hydroxide, or another material such as a conductive polymer (e.g., parafluorophenyl-thiophene).

Advantageously, ultracapacitors made using the inventive carbon-based electrodes exhibit energy densities that are more than twice the energy densities of ultracapacitors made using electrodes derived from commercially-available carbon material.

The inorganic compound used in accordance with the present invention can include an alkali hydroxide or chloride (e.g., NaOH, KOH, NaCl, KCl), phosphoric acid, or other suitable salt such as $CaCl_2$ or $ZnCl_2$.

The carbon precursor is a natural non-lignocellulosic material. As defined herein, a substance that contains both cellulose and lignin is lignocellulosic and, for example, can include any of several closely-related substances constituting the essential part of woody cell walls of plants having cellulose intimately associated with lignin. The non-lignocellulosic carbon precursors used in conjunction with the present invention are substantially free of at least one of lignin and cellulose. By substantially free is meant that at least one of the lignin and cellulose comprise, for example, at most 0.5, 1 or 2 wt. % of the composition of the carbon precursor.

In one embodiment, the natural non-lignocellulosic carbon precursor contains cellulose and is substantially free of lignin. In a further embodiment, the natural non-lignocellulosic carbon precursor contains lignin but is substantially free of cellulose. In a still further embodiment, the natural non-lignocellulosic carbon precursor is substantially free of both lignin and cellulose. The natural, non-lignocellulosic carbon precursor is not a synthetic material such as a synthetic resin.

Lignin, which is a Latin word for wood, is a compound that imparts rigidity to a plant. Lignin is a three-dimensional polymer having an amorphous structure and a high molecular weight. Of the three main constituents in plant fibers, lignin has the least affinity for water. In addition, lignin is a thermoplastic (i.e., lignin starts to soften at relatively low temperature and, with increasing temperature, will flow readily).

Cellulose is a basic structural component of plant fibers. Cellulose molecules can comprise, e.g., glucose units that are linked together in long chains, which in turn are linked together in bundles called microfibrils. Hemicelluloses are also found in plant fibers. Hemicelluloses are typically polysaccharides bonded together in relatively short, branching chains. Hemicelluloses, which are usually hydrophilic, are usually intimately associated with the cellulose microfibrils, embedding the cellulose in a matrix.

Typical lignocellulosic fibers from agriculture are found, for example, in straws, hemp, flax, sisal, and jute. On the other hand, non-lignocellulosic fibers are substantially free of lignin and/or cellulose.

The natural, non-lignocellulosic carbon precursor can be derived from an edible grain such as wheat flour, walnut flour, corn flour, corn starch, rice flour, and potato flour. Other natural, non-lignocellulosic carbon precursors include beets, millet, soybean, barley, and cotton. The non-lignocellulosic material can be derived from a crop or plant that may or may not be genetically-engineered.

An exemplary non-lignocellulosic carbon precursor is wheat flour. Wheat flour is derived by milling wheat kernels, which are the seeds of the wheat plant. Wheat kernels have three main parts: the endosperm, the germ, and the bran. Whole wheat flour contains all three parts of the kernel, while white flour is milled from just the endosperm.

Compositionally, white flour contains mostly starch, although additional components are naturally present. The main components in white flour, with approximate percentages provided in parentheses, are starch (68-76%), proteins (6-18%), moisture (11-14%), gums (2-3%), lipids (1-1.5%), ash (<0.5%) and sugars (<0.5%).

Starch makes up the bulk of white flour. Even bread flour, considered "low" in starch, contains more starch than all other components combined. Starch is typically present in flour as small grains or granules. Chunks of protein bind starch granules together and hold them in place within the endosperm. Glutenin and gliadin, the gluten-forming proteins, typically make up about 80 percent of the proteins in the endosperm. Other proteins in white flour include enzymes, such as amylase, protease, and lipase. Other carbohydrates in flour besides starch include gums, specifically pentosan gums. Pentosan gums are a source of soluble dietary fiber. Lipids include oils and emulsifiers, and ash includes inorganic matter (mineral salts), which can comprise iron, copper, potassium, sodium, and zinc.

EXAMPLES

The invention will be further clarified by the following examples.

Example 1

Wheat flour was first carbonized in flowing nitrogen at 800° C. for 2 hours. The resulting carbonized precursor was then mixed with a KOH solution (46 wt. % in water) in 1:5 (wt./wt.) ratio of carbon:KOH. The mixture was heated in nitrogen to 800° C. for 2 hours and cooled to room temperature. The cooled mixture was washed with water and then with dilute HCl to remove potassium. Complete elimination of potassium was confirmed by monitoring the pH of the effluent. The carbon powder product was dried and ground to a fine powder (~10 micrometers).

Eighty grams of the carbon powder was mixed with 10 grams of carbon black and 10 grams of PTFE to obtain a well-mixed mass. This mixture was then rolled on a roll mill to obtain a well-knit film having a thickness of about 100 micrometers. Carbon-based electrodes were produced by stamping the thin film.

The carbon-based electrodes were soaked in 1.5 M tetraethylammonium-tetrafluoroborate (TEA-TFB) in acetonitrile. A porous separator was also soaked in the electrolyte solution and an electrode/separator/electrode stack was assembled into a button cell with opposing aluminum current collectors. Standard voltametric as well galvanostatic tests were carried out to measure the performance of the cell. The volumetric capacitance of the activated carbon electrode was 96 F/cm$^3$.

Example 2

The experiment of Example 1 was repeated, except corn flour was substituted for wheat flour. The volumetric capacitance of the activated carbon electrode was 97 F/cm$^3$.

Example 3

Comparative

A comparative, resin-based carbon material was prepared by combining an aqueous solution of KOH (45 wt. %) with an aqueous phenolic resin (Georgia Pacific GP® 510D34) in a ratio of 3:1 by weight. The mixture was cured by heating in an oven at 125° C. for 24 hours and then at 175° C. for 24 hours to obtain a foam-like solid with a brown-yellow color. The cured mixture was broken into small pieces by mechanical force, placed in a graphite crucible and loaded in a retort furnace (CM Furnaces, Model 1216FL) for carbonization/activation.

The furnace temperature was ramped up at a rate of 200° C./hr to 800° C., held at 800° C. for 2 hours, and then cooled down naturally. Throughout the heating cycle, the furnace was purged with nitrogen gas.

After cooling to ambient temperature, the carbon material was soaked in DI water for a few minutes, filtered, soaked in a known amount of 37% HCl solution (2 mL for every 1 g of carbon) for an hour, filtered, and then washed repeatedly with DI water until the pH of the effluent was the same as that of DI source. The carbon was finally dried at 110° C. in a vacuum oven overnight and then ground to a desired particle size.

The volumetric capacitance measured using the procedure set forth in example 1 was 105 F/cm$^3$.

Example 4

Comparative

Figure 1B:

A commercially-available PICA carbon (derived from lignocellulosic materials), which was developed for use in ultracapacitor applications, was substituted for the inventive carbon material and was tested using the button-cell procedure described in example 1. The volumetric capacitance was 45 F/cm$^3$. FIGS. 1A and 1B show SEM micrographs of this material, which has a block-like granular structure. The BET surface area was 1800 m$^2$/g.

Example 5

Comparative

A further commercially-available Kuraray carbon—YP50 (derived from lignocellulosic materials) was also characterized using the button cell procedure according to example 1. The volumetric capacitance was 65 F/cm$^3$.

Example 6

Wheat flour was mixed with a KOH solution (46 wt. % in water) to obtain a 1:3 ratio (wt./wt.) of flour:KOH. The mixture was allowed to age for 1 hour to allow incorporation of the KOH into the wheat flour structure. The mixture was then placed into a controlled atmosphere furnace, heated under flowing nitrogen to 800° C. for 4 hours, and cooled in nitrogen to room temperature.

After cooling, the mixture was washed initially with water and then with dilute HCl to remove potassium. Complete elimination of potassium was confirmed by monitoring the pH of the effluent. The carbon material was dried and ground to a fine (10 micrometer) powder.

Figure 2:
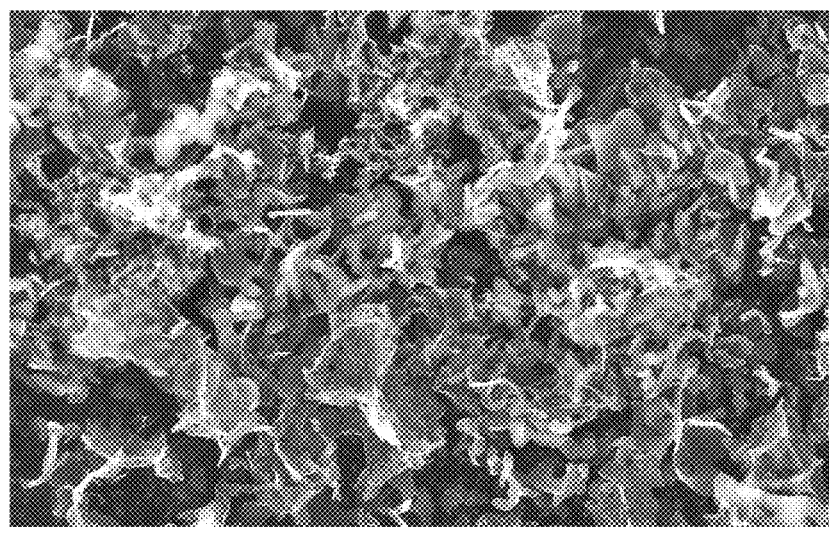
FIG. 2 is an SEM micrograph showing inventive carbon material derived from a natural, non-lignocellulosic carbon precursor.

An SEM micrograph of the carbon material is shown in FIG. 2. In contrast to the comparative PICA carbon of example 4, this inventive carbon comprises flakes of carbon material. It is believed that this structure facilitates packing of the carbon material during electrode fabrication.

A button cell was assembled according to the procedure of example 1. The volumetric capacitance was 95 F/cm$^3$.

Example 7

Comparative

The experiment of Example 6 was repeated, except walnut shell flour was substituted for wheat flour. The volumetric capacitance was 59 F/cm$^3$. This example shows lower volumetric capacitance achieved with a lignocellulosic precursor.

Example 8

The experiment of Example 6 was repeated with corn flour, except the flour:KOH ratio was 1:5 and the sample was heated in a furnace set to 700° C.

Example 9

The experiment of Example 6 was repeated with rice flour. The carbon was mixed with binder and electrodes were fabricated according to the procedure described in example 1. The volumetric capacitance was 80 F/cm$^3$.

Example 10

The experiment of Example 6 was repeated, except the wheat flour to KOH ratio was changed to 1:1. The carbon was mixed with binder and electrodes were fabricated as described in example 1. The volumetric capacitance was 88 F/cm$^3$.

Example 11

Wheat flour was first carbonized in nitrogen at 800° C. in nitrogen for 4 hours. The carbonized precursor material obtained was mixed with a KOH solution (46 wt. % in water) in 1:3 (wt./wt.) ratio of carbon:KOH. The mixture was then heated in nitrogen to 800° C. for 4 hours and allowed to cool in nitrogen to room temperature. After cooling, the mixture was washed with water and finally with dilute HCl to remove potassium. Complete elimination of potassium was confirmed by monitoring the pH of the effluent. The carbon was then dried and ground to a fine powder (~10 micrometers), mixed with binder, and electrodes were fabricated as described in example 1. The volumetric capacitance was 94 F/cm$^3$.

Example 12

The experiment of example 11 was repeated with corn flour. The carbon was mixed with binder and electrodes were fabricated as described in example 1. The volumetric capacitance was 91 F/cm$^3$.

Example 13

Wheat flour was first carbonized in nitrogen to 850° C., followed by activation in carbon dioxide. The carbon thus obtained was mixed with binder and electrodes were fabricated as described in example 1. The volumetric capacitance was 80 F/cm$^3$.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for producing an activated carbon material comprising:
   forming an aqueous mixture consisting essentially of a natural, non-lignocellulosic carbon precursor selected from the group consisting of wheat flour, corn flour, rice flour and potato flour, and an inorganic compound;
   heating the aqueous mixture in an inert or reducing atmosphere to form a first carbon material; and
   removing the inorganic compound from the first carbon material to produce a powdered activated carbon material.

2. A method according to claim 1, wherein the inorganic compound is selected from the group consisting of an alkali hydroxide, alkali chloride, phosphoric acid, calcium chloride and zinc chloride.

3. A method according to claim 1, wherein the inorganic compound is selected from the group consisting of sodium hydroxide, potassium hydroxide, sodium chloride and potassium chloride.

4. A method according to claim 1, wherein a weight ratio of inorganic compound to non-lignocellulosic carbon precursor in the aqueous mixture is between about 5:1 and 1:5.

5. A method according to claim 1, wherein a weight ratio of inorganic compound to non-lignocellulosic carbon precursor in the aqueous mixture is greater than or equal to 1.

6. A method according to claim 1, further comprising aging the aqueous mixture for an aging time ranging from between about 0.5 to 8 hours prior to the step of heating.

7. A method according to claim 1, wherein the step of heating comprising heating the mixture at a temperature in the range of about 600° C. to 900° C.

8. A method according to claim 1, wherein the step of removing the inorganic compound comprises rinsing the first carbon material in a solvent.

9. A method according to claim 8, wherein the solvent is water.

10. The method according to claim 1, further comprising grinding the first carbon material after removing the inorganic compound to form the powdered activated carbon material.

11. A method for producing a carbon-based electrode comprising:
    forming an aqueous mixture consisting essentially of a natural, non-lignocellulosic carbon precursor selected from the group consisting of wheat flour, corn flour, rice flour and potato flour, and an inorganic compound;
    heating the aqueous mixture in an inert or reducing atmosphere to form a first carbon material;
    removing the inorganic compound from the first carbon material to produce an activated carbon material;

mixing the activated carbon material with at least one of carbon black and PTFE to form an electrode mixture; and forming a carbon-based electrode from the electrode mixture.

12. A method according to claim 11, wherein the activated carbon material is dried to form a powder prior to forming the carbon-based electrode.

13. A method according to claim 11, further comprising incorporating the carbon-based electrode into a high energy density device.

14. A method according to claim 13, wherein the high energy density device is an ultracapacitor.

15. A method according to claim 14, wherein the ultracapacitor has a design selected from the group consisting of a jelly roll design, a prismatic design, and a honeycomb design.

16. A method for producing an activated carbon material comprising:

heating a natural, non-lignocellulosic carbon precursor selected from the group consisting of wheat flour, corn flour, rice flour and potato flour in an inert or reducing atmosphere to form a first carbon material;

mixing the first carbon material with an inorganic compound to form a mixture that consists essentially of the first carbon material and the inorganic compound;

heating the mixture in an inert or reducing atmosphere to incorporate the inorganic compound into the first carbon material; and removing the inorganic compound from the first carbon material to produce an activated carbon material.

17. A method according to claim 16, wherein the mixture comprises an aqueous mixture of the inorganic compound.

18. A method according to claim 17, further comprising aging the mixture for an aging time ranging from between about 0.5 to 8 hours prior to the step of heating.

19. A method according to claim 16, wherein the step of heating the mixture comprising heating at a temperature in the range of about 300° C. to 850° C.

20. A method for producing a carbon-based electrode comprising:

heating a natural, non-lignocellulosic carbon precursor selected from the group consisting of wheat flour, corn flour, rice flour and potato flour in an inert or reducing atmosphere to form a first carbon material;

mixing the first carbon material with an inorganic compound to form a mixture that consists essentially of the first carbon material and the inorganic compound;

heating the mixture in an inert or reducing atmosphere to incorporate the inorganic compound into the first carbon material;

removing the inorganic compound from the first carbon material to produce an activated carbon material; and forming a carbon-based electrode from the activated carbon material.

21. A method for producing a carbon-based electrode comprising:

heating a natural, non-lignocellulosic carbon precursor selected from the group consisting of wheat flour, corn flour, rice flour and potato flour in an inert or reducing atmosphere to form an intermediate carbon material that consists essentially of the natural, non-lignocellulosic carbon precursor;

heating the intermediate carbon material in an oxidizing atmosphere to produce an activated carbon material powder; and forming a carbon-based electrode from the activated carbon material powder.

* * * * *